(12) United States Patent
Chapman et al.

(10) Patent No.: US 11,965,449 B2
(45) Date of Patent: Apr. 23, 2024

(54) VENTURI MIXER WITH CLAMSHELL STAMPING

(71) Applicant: Faurecia Emissions Control Technologies, USA, LLC, Columbus, IN (US)

(72) Inventors: Chris Chapman, Columbus, IN (US); Eduardo Alano, Colubmus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 17/242,943

(22) Filed: Apr. 28, 2021

(65) Prior Publication Data

US 2022/0349330 A1   Nov. 3, 2022

(51) Int. Cl.
*F01N 3/28*   (2006.01)
*F01N 3/20*   (2006.01)

(52) U.S. Cl.
CPC ......... *F01N 3/2892* (2013.01); *F01N 3/2066* (2013.01); *F01N 2240/20* (2013.01); *F01N 2610/08* (2013.01)

(58) Field of Classification Search
CPC .. F01N 3/2892; F01N 3/2066; F01N 2240/20; F01N 2610/08; F01N 2470/00; F01N 2470/02; F01N 2470/04; F01N 2470/06; F01N 2470/30
USPC .......................................................... 60/324
See application file for complete search history.

(56) References Cited

U.S. PATENT DOCUMENTS

| | | | |
|---|---|---|---|
| 8,661,792 B2 | 3/2014 | Greber et al. | |
| 9,821,282 B2 | 11/2017 | Li et al. | |
| 10,473,018 B2 | 11/2019 | Vankan et al. | |
| 10,792,626 B1 | 10/2020 | Liu et al. | |
| 2009/0064671 A1* | 3/2009 | Cheng | F01N 3/2892 60/324 |
| 2010/0212292 A1* | 8/2010 | Rusch | F01N 3/2066 60/274 |
| 2015/0110681 A1* | 4/2015 | Ferront | B01F 23/2132 422/168 |
| 2016/0131007 A1* | 5/2016 | Kauderer | B01D 53/9431 422/177 |
| 2017/0089246 A1* | 3/2017 | Greber | F01N 3/2073 |
| 2018/0058294 A1* | 3/2018 | Zhang | F01N 13/08 |
| 2019/0388851 A1 | 12/2019 | Moulieres | |
| 2020/0123955 A1* | 4/2020 | Liu | F01N 3/106 |

* cited by examiner

*Primary Examiner* — Kenneth J Hansen
*Assistant Examiner* — Kelsey L Stanek
(74) *Attorney, Agent, or Firm* — Foley & Lardner LLP

(57) ABSTRACT

A mixer for a vehicle exhaust gas system, according to an exemplary aspect of the present disclosure includes, among other things, a mixer housing defining an internal cavity and a venturi section including integrally formed mixing vanes and positioned within the internal cavity. The venturi section comprises a first portion and a second portion that are combined to provide a mixing chamber therebetween. A doser mount opening is formed within the mixer housing that is open to the mixing chamber.

22 Claims, 2 Drawing Sheets

US 11,965,449 B2

VENTURI MIXER WITH CLAMSHELL STAMPING

TECHNICAL FIELD

This disclosure relates generally to the field of vehicle exhaust systems, and more particularly to a mixer used in such exhaust systems.

BACKGROUND

An exhaust system includes catalyst components to reduce emissions. The exhaust system includes an injection system that injects a diesel exhaust fluid (DEF), or a reducing agent such as a solution of urea and water for example, upstream of a selective catalytic reduction (SCR) catalyst which is used to reduce NOx emissions. The injection system includes a doser that sprays the fluid into the exhaust stream via an injection valve. A mixer is used to mix the introduced reductant with the exhaust gas flow.

SUMMARY

A mixer for a vehicle exhaust gas system, according to an exemplary aspect of the present disclosure includes, among other things, a mixer housing defining an internal cavity and a venturi section that includes integrally formed mixing vanes and which is positioned within the internal cavity. The venturi section comprises a first portion and a second portion that are combined to provide a mixing chamber therebetween. A doser mount opening is formed within the mixer housing and is open to the mixing chamber.

In a further non-limiting embodiment of the foregoing mixer, the first portion comprises a first stamping with a first attachment interface and the second portion comprises a second stamping with a second attachment interface that mates with the first attachment interface to attach the first and second portions to each other.

In a further non-limiting embodiment of any of the foregoing mixers, the first and second stampings are identical to each other.

In a further non-limiting embodiment of any of the foregoing mixers, each of the first and second stampings include the integrally formed mixing vanes and each of the first and second stampings include a portion of a doser chamber having an inlet aligned with the doser mount opening and an outlet that is open to the mixing chamber.

In a further non-limiting embodiment of any of the foregoing mixers, the first portion comprises a first base surface with a first wall extending away from the first base surface about a periphery of the first base surface to form a first shell, and wherein the second portion comprises a second base surface with a second wall extending away from the second base surface about a periphery of the second base surface to form a second shell.

In a further non-limiting embodiment of any of the foregoing mixers, the first and second base surfaces comprise generally flat surfaces, and wherein at least one of the first and second base surfaces includes the integrally formed mixing vanes, with each mixing vane being bent away from the at least one of the first and second base surfaces to provide openings that allow exhaust gas to flow into or out of the mixing chamber.

In a further non-limiting embodiment of any of the foregoing mixers, the first wall includes a first doser chamber portion and the second wall includes a second doser chamber portion that cooperates with the first doser chamber portion to form an injection chamber having an inlet aligned with the doser mount opening and an outlet that is open to the mixing chamber.

In a further non-limiting embodiment of any of the foregoing mixers, the first and second doser chamber portions are attached to each other to form a doser cone wherein the inlet is defined by a first dimension that is less than a second dimension that defines the outlet.

In a further non-limiting embodiment of any of the foregoing mixers, the integrally formed mixing vanes comprise a first plurality of mixing vanes formed in the first portion and a second plurality of mixing vanes formed in the second portion, and wherein the first portion includes a first doser chamber portion and the second portion includes a second doser chamber portion.

In a further non-limiting embodiment of any of the foregoing mixers, the first portion comprises an upstream base surface with a first wall extending away from the upstream base surface about a periphery of the upstream base surface to form a first shell, and wherein the second portion comprises a downstream base surface with a second wall extending away from the downstream base surface about a periphery of the downstream base surface to form a second shell, and wherein the first wall includes the first doser chamber portion and the second wall includes the second doser chamber portion that cooperates with the first doser chamber portion to form an injection chamber having an inlet aligned with the doser mount opening and an outlet that is open to the mixing chamber, and wherein the upstream and downstream base surfaces comprise generally flat surfaces, and wherein each mixing vane of the first plurality of mixing vanes is bent away from the upstream base surface to provide openings that allow exhaust gas to flow into the mixing chamber, and wherein each mixing vane of the second plurality of mixing vanes is bent away from the downstream base surface to provide openings that allow exhaust gas to exit the mixing chamber.

In a further non-limiting embodiment of any of the foregoing mixers, the venturi section comprises a tube with an upstream end and a downstream end, and wherein the integrally formed mixing vanes comprise a plurality of upstream mixing vanes formed directly in the upstream end of the tube to provide the first portion, and wherein the integrally formed mixing vanes comprise a plurality of downstream mixing vanes formed directly in the downstream end of the tube to provide the second portion.

A mixer for a vehicle exhaust gas system, according to yet another exemplary aspect of the present disclosure includes, among other things, a mixer housing defining an internal cavity and a venturi section positioned within the internal cavity and including a plurality of mixing vanes. The venturi section comprises a first stamping and a second stamping that are attached to each other to provide a mixing chamber therebetween and to provide a doser chamber having an inlet and an outlet that is open to the mixing chamber. A doser mount opening is formed within the mixer housing and is aligned with the inlet.

In a further non-limiting embodiment of any of the foregoing mixers, the second stamping is identical to the first stamping.

In a further non-limiting embodiment of any of the foregoing mixers, the first stamping comprises an upstream base surface with a first wall extending away from the upstream base surface about a periphery of the upstream base surface, and wherein the second stamping comprises a downstream base surface with a second wall extending away from the downstream base surface about a periphery of the downstream base surface.

In a further non-limiting embodiment of any of the foregoing mixers, the plurality of mixing vanes comprise a plurality of upstream vanes and a plurality of downstream vanes, and wherein the upstream and downstream base surfaces comprise generally flat surfaces, and wherein the upstream base surface includes the plurality of upstream mixing vanes, with each upstream mixing vane being bent away from the upstream base surface to provide openings that allow exhaust gas to flow into the mixing chamber, and wherein the downstream base surface includes the plurality of downstream mixing vanes, with each downstream mixing vane being bent away from the downstream base surface to provide openings that allow exhaust gas to exit the mixing chamber.

A method according to still another exemplary aspect of the present disclosure includes, among other things, providing a mixer housing defining an internal cavity; forming a venturi member with integrally formed mixing vanes and that comprises an upstream portion and a downstream portion that cooperate with each other to form an internal mixing chamber; and positioning the venturi member within the internal cavity.

In a further non-limiting embodiment of the foregoing method, the integrally formed mixing vanes comprise a plurality of upstream mixing vanes and a plurality of downstream mixing vanes, and the method includes: stamping the upstream portion; stamping the downstream portion; forming a plurality of slits in an upstream surface of the upstream portion to outline the plurality of upstream mixing vanes; forming a plurality of slits in a downstream surface of the downstream portion to outline the plurality of downstream mixing vanes; bending each upstream mixing vane away from the upstream surface to form inlet openings between the upstream mixing vanes; bending each downstream mixing vane away from the downstream surface to form outlet openings between the downstream mixing vanes; and attaching the upstream portion and the downstream portion to each other to form the venturi member having the internal mixing chamber.

In a further non-limiting embodiment of any of the foregoing methods, the method includes forming the upstream portion and the downstream portion as identical half stampings.

In a further non-limiting embodiment of any of the foregoing methods, the method includes: forming a doser mount opening within the mixer housing: during the stamping of the upstream portion, forming an upstream portion of a doser chamber; during the stamping of the downstream portion, forming a downstream portion of the doser chamber; and during the attaching of the upstream portion and the downstream portion to each other, aligning the upstream and downstream portions of the doser chamber with each other to form the doser chamber having an inlet aligned with the doser mount opening and an outlet that is open to the mixing chamber.

In a further non-limiting embodiment of any of the foregoing methods, the venturi section comprises a tube with an upstream end and a downstream end, and wherein the integrally formed mixing vanes comprise a plurality of upstream mixing vanes formed directly in the upstream end of the tube to provide the first portion, and wherein the integrally formed mixing vanes comprise a plurality of downstream mixing vanes formed directly in the downstream end of the tube to provide the second portion, and the method further includes relief cutting the upstream end of the tube to form the plurality of upstream mixing vanes, and relief cutting the downstream end of the tube to form the plurality of downstream mixing vanes.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary mixer that includes a venturi section that includes integrally formed mixing vanes.

Figure 1:
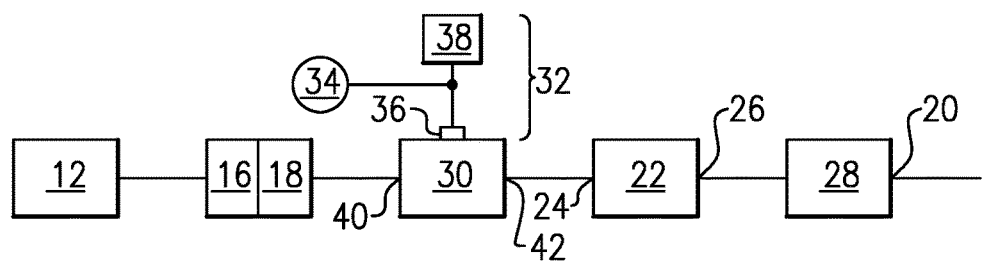
FIG. 1 schematically illustrates one example of an exhaust system according to the subject disclosure.

FIG. 1 shows a vehicle exhaust system 10 that conducts hot exhaust gases generated by an engine 12 through various exhaust components to reduce emission and control noise as known. In one example configuration, at least one pipe 14 directs engine exhaust gases exiting an exhaust manifold of the engine 12 into one or more exhaust gas aftertreatment components. In one example, the exhaust gas aftertreatment components include a diesel oxidation catalyst (DOC) 16, and an optional diesel particulate filter (DPF) 18 that is used to remove contaminants from the exhaust gas as known.

Downstream of the DOC 16 and optional DPF 18 is a selective catalytic reduction (SCR) catalyst 22 having an inlet 24 and an outlet 26. Optionally, component 22 can comprise a catalyst that is configured to perform a selective catalytic reduction function and a particulate filter function. The outlet 26 from the SCR 22 communicates exhaust gases to downstream exhaust components 28 and the exhaust gas eventually exits to atmosphere via a tailpipe 20. The various downstream exhaust components 28 can include one or more of the following: pipes, filters, valves, catalysts, mufflers etc. These exhaust system components can be mounted in various different configurations and combinations dependent upon vehicle application and available packaging space.

In one example, a mixer 30 is positioned downstream from an outlet of the DOC 16 or DPF 18 and upstream of the inlet 24 of the SCR 22. The DOC/DPF and SCR can be in-line or in parallel, for example. The mixer 30 is used to facilitate mixing of the exhaust gas.

An injection system 32 is used to inject a reducing agent, such as diesel exhaust fluid (DEF), for example, into the exhaust gas stream upstream from the SCR catalyst 22 such that the mixer 30 can mix the DEF and exhaust gas thoroughly together. The injection system 32 includes a fluid supply tank 34, a doser 36, and a controller 38 that controls injection of the fluid as known. In one example, the doser 36 injects the DEF into the mixer 30 as shown in FIG. 1. In other examples, the doser 36 can inject the DEF into the exhaust system at other locations such as upstream of the mixer 30.

A control system includes the controller 38 that controls injection of the DEF based on one or more of exhaust gas temperature, backpressure, time, etc. The controller 38 can be a dedicated electronic control unit or can be an electronic control unit associated with a vehicle system control unit or sub-system control unit. The controller 38 can include a processor, memory, and one or more input and/or output (I/O) device interface(s) that are communicatively coupled via a local interface. The controller 38 may be a hardware device for executing software, particularly software stored in memory.

The mixer 30 is used to generate a swirling or rotary motion of the exhaust gas. FIGS. 2-6 show the mixer 30 in greater detail. The mixer 30 has an inlet end 40 configured to receive the engine exhaust gases and an outlet end 42 to direct a mixture of swirling engine exhaust gas and products transformed from the injected fluid to the SCR catalyst 22.

Figure 2:
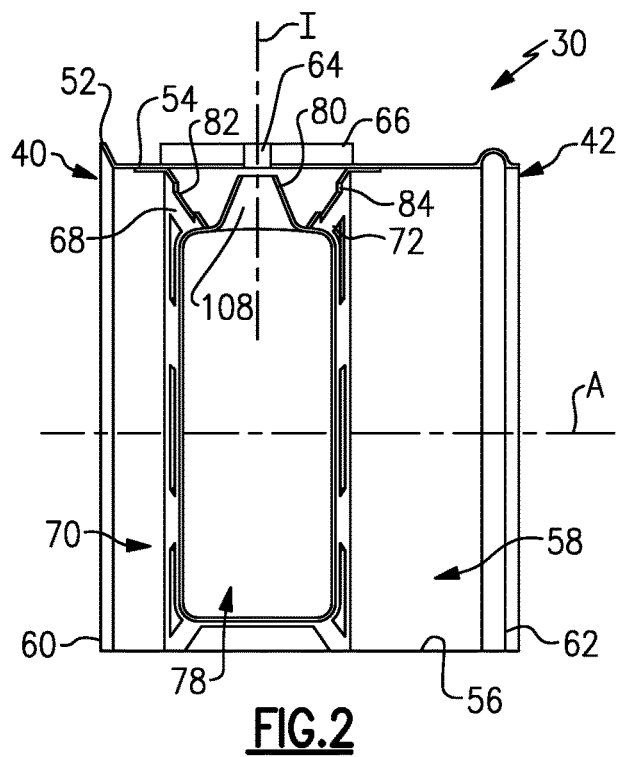
FIG. 2 is a side section view of one example of a mixer with a venturi section made from two stampings.

FIG. 2 shows a mixer 30 according to an example embodiment. The mixer 30 includes a mixer housing 52 having an external surface 54 and an internal surface 56 defining an internal cavity 58 having a center axis A. The mixer housing 52 has an upstream peripheral edge 60 at the mixer inlet end 40 that directs the exhaust gases into the mixer 30 and a downstream peripheral edge 62 at the mixer outlet end 42 through which the exhaust gases exit from the mixer 30. In one example, the mixer inlet end 40 receives the exhaust gases from the diesel particulate filter 18 and the mixer outlet end 42 provides the exhaust gases to the SCR catalyst 22. The mixer housing 52 includes an injector or doser mount opening 64 through which reductant is introduced into the internal cavity 58 to mix with the exhaust gases. The doser mount opening 64 extends through a thickness of the housing 52 from the external surface 54 to the internal surface 56. A doser mount plate 66 is located on the external surface 54 to allow the doser 36 to be mounted to the mixer 30.

As shown in FIG. 2, a venturi member, section, or body 70 is positioned within the internal cavity 58. An upstream support flange 68 and a downstream support flange 72 are used to mount the venturi body 70 within the mixer 30. The upstream support flange 68 is connected with the venturi body 70 which is connected with the downstream support flange 72. A majority of the exhaust gases is directed from the mixer inlet end 40 into the venturi body 70. A portion of exhaust gases can pass outside the venturi body 70 pass the upstream support flange 68 via openings 82. The upstream support flange 68 can have various angles relative to the center axis A of the mixer 30. The downstream support flange 72 can also include openings 84.

The venturi body 70 includes a first or upstream portion 74 and a second or downstream portion 76. The upstream portion 74 receives the exhaust gases from the mixer inlet end 40. The upstream portion 74 and downstream portion 76 are attached to each other to provide an internal mixing chamber 78 therebetween. The upstream support flange 68 is positioned adjacent to the upstream portion 74 and the downstream support flange 72 is positioned adjacent to the downstream portion 76.

The venturi body 70 includes a doser inlet 80 that is aligned with the doser mount opening 64. This allows the doser mount opening 64 that is formed within the mixer housing 52 to be open to the mixing chamber 78. The doser inlet 80 is positioned between the upstream support flange 68 and downstream support flange 72. The downstream support flange 72 attaches the Venturi body 70 to the mixer housing 52. In one example, the support flange 72 may include openings 84 to allow exhaust gases to pass through the downstream support flange 72.

In one example, the first or upstream portion 74 comprises a first half stamping with a first attachment interface 86 and the second or downstream portion 76 comprises a second half stamping with a second attachment interface 88 that mates with the first attachment interface 86. The first 86 and second 88 attachment interfaces can be welded or brazed to each other, for example.

Figure 3:
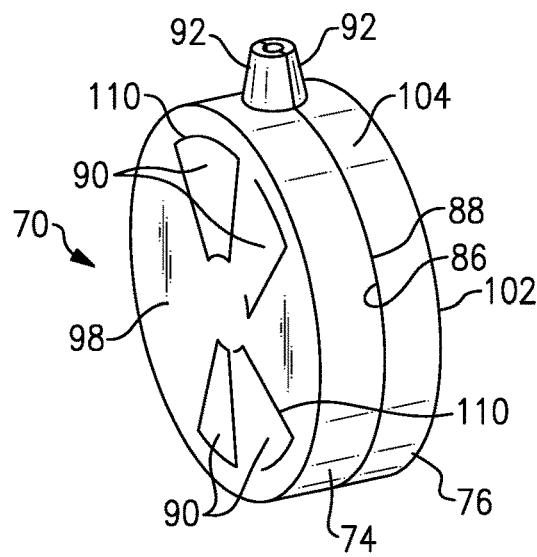
FIG. 3 is a perspective view of the venturi section of FIG. 2 with the mixing vanes in an unbent position.
Figure 4:
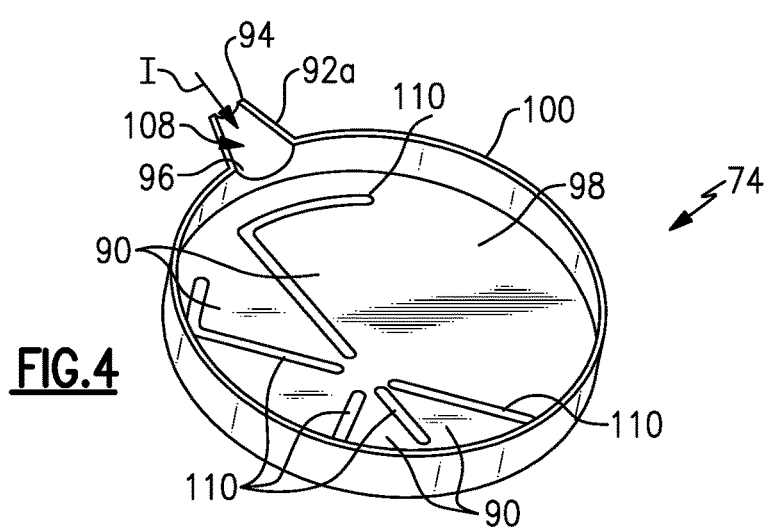
FIG. 4 is a side perspective view of one stamping of the venturi section of FIG. 3.
Figure 6:
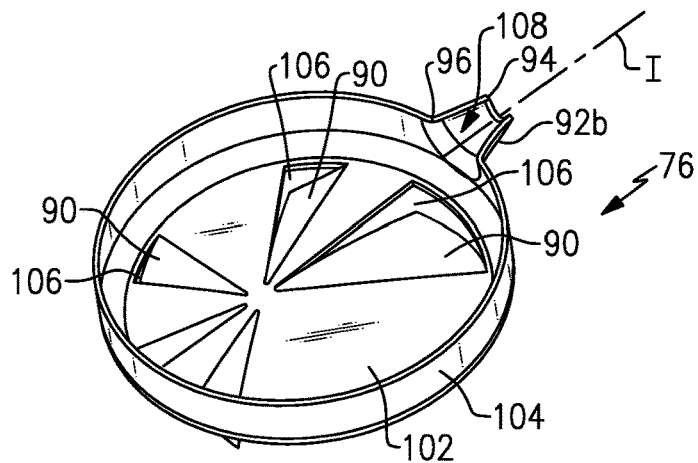
FIG. 6 is a perspective view of another stamping of the venturi section of FIG. 3 with the vanes in a bent position.

In one example, the first and second half stampings include a plurality of integrally formed mixing vanes 90 and an integrally formed portion 92 of a doser chamber having an inlet 94 aligned with the doser mount opening 64 and an outlet 96 that is open to the mixing chamber 78. As shown in FIG. 4, the first stamping for the upstream portion 74 comprises a first base surface 98 with a first wall 100 extending away from the first base surface 98 about a periphery of the first base surface 98 to form a first shell. The second stamping for the downstream portion 76 comprises a second base surface 102 with a second wall 104 extending away from the second base surface 102 about a periphery of the second base surface 102 to form a second shell as shown in FIGS. 3 and 6.

In one example, the first 98 and second 102 base surfaces comprise generally flat and planar surfaces. At least one or both of the first 98 and second 102 base surfaces includes one or more of the mixing vanes 90. Each mixing vane 90 is cut out from the respective planar surface and is bent away from an initial position (shown in FIG. 4) where the vanes 90 are coplanar with the first 98 and second 102 bases to a final position where the mixing vanes 90 are bent away from the first 98 and second 102 base surfaces to provide openings 106 that allow exhaust gas to flow into or out of the mixing chamber 78 (see FIGS. 5-6).

In one example, the first wall 100 includes an integrally formed first or upstream doser chamber portion 92a and the second wall 104 includes an integrally formed second or downstream doser chamber portion 92b. The first doser chamber portion 92a is aligned with the second doser chamber portion 92b when the upstream 74 and downstream 76 portions of the Venturi section 70 are attached to each other. The first doser chamber portion 92a and the second doser chamber portion 92b cooperate with each other to form an open injection or doser chamber 108, which has the inlet 94 aligned with the doser mount opening 64 and the outlet 96 that is open to the mixing chamber 78. Fluid from the doser 36 is injected along an injection axis I into the injection/doser chamber 108. The fluid exits the chamber 108 via the outlet 96 to mix with the exhaust gas.

In one example, the first 92a and second 92b doser chamber portions are attached to each other to form a doser cone that has a variable cross-section. In one example, the inlet 94 is defined by a first dimension, such as an inlet diameter for example, that is less than a second dimension that defines the outlet 96, such as an outlet diameter for example. This allows injected fluid to spread out and be more evenly distributed within the mixing chamber 78.

In one example, the upstream portion 74 is formed to include a plurality of upstream mixing vanes 90 and the upstream doser chamber portion 92*a*, and the downstream portion 76 is formed to include a plurality of downstream mixing vanes 90 and the downstream doser chamber portion 92*b*. The upstream portion 74 and the downstream portion 76 thus form a clamshell or half-shell configuration. In one example, the half-shells are formed as stampings. In one example, the two stampings are identical to each other. This is advantageous as it saves on tooling cost.

Figure 5:
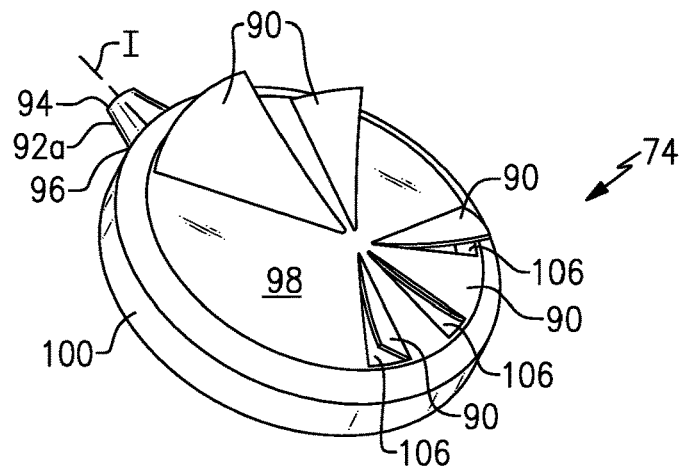
FIG. 5 is a perspective view of one stamping of the venturi section of FIG. 3 with the vanes in a bent position.

The disclosure also provides a method for manufacturing the Venturi section 70. In one example, the method includes the following steps. A mixer housing 52 is provided that includes an internal cavity 58. An upstream portion 74 of a Venturi member 70 is stamped as a first half-shell as shown in FIG. 5 and a downstream portion 76 of the Venturi member 70 is stamped as a second half-shell as shown in FIG. 6. A plurality of slots, slices, or slits 110 is formed in an upstream surface e.g. base surface 98, of the upstream portion 74, to outline a plurality of upstream mixing vanes 90. A plurality of slots, slices, or slits 110 (FIG. 4) is formed in a downstream surface, e.g. base surface 102, of the downstream portion 76 to outline a plurality of downstream mixing vanes 90. Each upstream mixing vane 90 is bent away from an initial position of being co-planar with the upstream surface to a final position where the upstream mixing vanes 90 are angled relative to the base surface 98. This bending step also forms inlet openings 106 between adjacent upstream mixing vanes 90. Each downstream mixing vane 90 is bent away from an initial position of being co-planar with the downstream surface to a final position where the downstream mixing vanes 90 are angled relative to the base surface 102. This bending step also forms outlet openings 106 between adjacent downstream mixing vanes 90. Any of various angles can be provided for the upstream and downstream mixing vanes 90 to achieve the desired mixing effect.

Additional steps include attaching the upstream portion 74 and downstream portion 76 to each other to form the venturi member 70, which has an internal mixing chamber 78, and then subsequently positioning the venturi member 70 within the internal cavity 58 of the mixer housing 52.

In one example, the method includes forming the upstream portion 74 and the downstream portion 76 as identical half stampings. In one example, the stamping method also includes, during the stamping of the upstream portion 74, forming an upstream portion 92*a* of a doser chamber 108, and during the stamping of the downstream portion 76, forming a downstream portion 92*b* of the doser chamber 108. Further, during the attaching of the upstream portion 74 and the downstream portion 76 to each other, the upstream 92*a* and downstream 92*b* portions of the doser chamber 108 are aligned with each other to form the doser chamber 108 that has the inlet 94 aligned with the doser mount opening 64 in the mixer housing 52 and the outlet 96 that is open to the mixing chamber 78.

In one example, the plurality of slots or slits 110 in the upstream surface and downstream surface are formed during stamping. In another example, the method includes laser cutting the plurality of slots or slits 110 in the upstream surface and downstream surface of the upstream 74 and downstream 76 portions.

Figure 7:
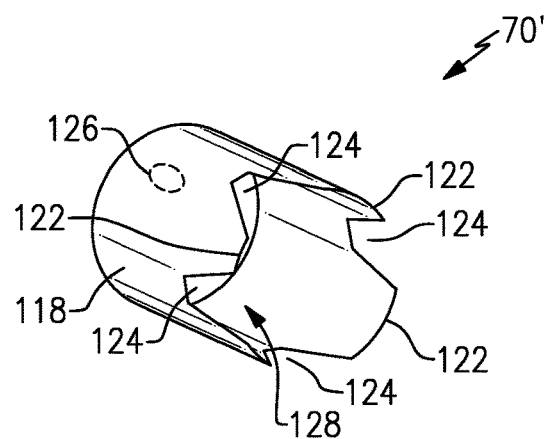
FIG. 7 is a perspective view of another example of a venturi section.

FIG. 7 shows another example of a venturi member or body 70'. In this example, a pipe or tube 118 is relief cut to allow the ends portions 120 of the tube 118 to be bent inwards to form mixing vanes 122 that alternate with openings 124. FIG. 7 shows unbent vanes 122; however, the vanes 122 would be bent at similar angles as that shown in FIGS. 5-6. Additionally, FIG. 7 shows only one end with vanes 122; however, it should be understood that the opposite end would be relief cut in a similar manner such that both ends would include vanes 122. As such, the venturi section 70' comprises a single-piece structure that would have both upstream and downstream integrally formed mixing vanes 122 that would operate as described above. The tube 118 could also have a doser opening 126 formed through a thickness of the tube 118 that would align with the doser opening 64 in the mixer housing 52 to allow fluid to be injected in a mixing chamber 128 of the venturi section 70'.

The subject disclosure provides a venturi body that can contribute to draw thermal energy from the system to keep the doser within temperatures limits. The subject disclosure provides that the venturi body is formed by two separate halves where each half has a portion of the cylindrical/conical structure of the doser chamber. This provides for simplification by combining components, while also providing a reduction of component stack up and cost reduction.

The disclosure provides that the two separate halves comprise two half stampings, where the stampings are identical to save on tooling cost. The mixing vanes are incorporated into the stampings by either being stamped or laser cut on a front or end face of the stampings. This reduces having to form additional components and to require additional operations. Additionally, the doser cone/chamber is also in two halves, with one half of the doser cone being incorporated into each stamping, which further reduces the need for additional components and welding operations. In one example, the doser is offset from the central axes.

In another example, the venturi section is a single-piece component with integrally formed vanes at each end. This also provides a cost reduction as the number of components for the mixer are reduced.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A mixer for a vehicle exhaust gas system, the mixer comprising:
    a mixer housing defining an internal cavity having a center axis;
    a venturi section including integrally formed mixing vanes and positioned within the internal cavity, wherein the venturi section comprises a first portion having a first base surface that faces an upstream direction and a second portion having a second base surface that faces a downstream direction, and wherein the first base surface comprises a first planar surface and the second base surface comprises a second planar surface that is parallel to the first planar surface, and wherein the first portion and the second portion are combined to provide a mixing chamber therebetween, and including a first doser chamber portion protruding radially outward of the first portion and a second doser chamber portion protruding radially outward of the second portion to cooperate with the first doser chamber portion to form a doser chamber;

wherein the integrally formed mixing vanes include a plurality of first mixing vanes extending outwardly from the first planar surface in the upstream direction and a plurality of second mixing vanes extending outwardly from the second planar surface in a downstream direction; and a doser mount opening formed within the mixer housing that is open to the doser chamber.

2. The mixer according to claim 1, wherein the first portion comprises a first stamping with a first attachment interface and the second portion comprises a second stamping with a second attachment interface that directly mates with the first attachment interface to attach the first and second portions to each other.

3. The mixer according to claim 2, wherein the first and second stampings are identical to each other.

4. The mixer according to claim 2, wherein the first stamping includes the first doser chamber portion and the second stamping includes the second doser chamber portion, and wherein the doser chamber has an inlet that is spaced apart from and aligned with the doser mount opening and an outlet that is open to the mixing chamber.

5. A mixer for a vehicle exhaust gas system, the mixer comprising:

a mixer housing defining an internal cavity having a center axis;

a venturi section including integrally formed mixing vanes and positioned within the internal cavity, wherein the venturi section comprises a first portion having a first base surface that faces an upstream direction and a second portion having a second base surface that faces a downstream direction, and wherein the first portion comprises the first base surface facing the upstream direction with a first wall extending downstream and away from the first base surface about a periphery of the first base surface to form a first shell, and wherein the second portion comprises the second base surface facing the downstream direction with a second wall extending upstream and away from the second base surface about a periphery of the second base surface to form a second shell, and wherein the first portion and the second portion are combined to provide a mixing chamber therebetween, and including a first doser chamber portion protruding radially outward of the first portion and a second doser chamber portion protruding radially outward of the second portion to cooperate with the first doser chamber portion to form a doser chamber; and a doser mount opening formed within the mixer housing that is open to the doser chamber.

6. The mixer according to claim 5, wherein the first and second base surfaces comprise flat surfaces, and wherein at least one of the first and second base surfaces includes the integrally formed mixing vanes, with each mixing vane being bent away from the at least one of the first and second base surfaces to provide openings that allow exhaust gas to flow into or out of the mixing chamber.

7. The mixer according to claim 5, wherein the first wall includes the first doser chamber portion and the second wall includes the second doser chamber portion that cooperates with the first doser chamber portion to form the doser chamber having an inlet spaced apart from and aligned with the doser mount opening and an outlet that is open to the mixing chamber.

8. The mixer according to claim 7, wherein the first and second doser chamber portions are attached to each other to form a doser cone that encloses the doser chamber, and wherein the inlet is defined by a first dimension that is less than a second dimension that defines the outlet.

9. The mixer according to claim 5, wherein the first wall includes the first doser chamber portion and the second wall includes the second doser chamber portion that cooperates with the first doser chamber portion to form the doser chamber that has an inlet aligned with the doser mount opening and an outlet that is open to the mixing chamber, and wherein the first and second base surfaces comprise flat surfaces, and wherein each mixing vane of the first portion is bent away from the first base surface to provide openings that allow exhaust gas to flow into the mixing chamber, and wherein each mixing vane of the second portion is bent away from the second base surface to provide openings that allow the exhaust gas to exit the mixing chamber.

10. The mixer according to claim 1, wherein an inlet of the doser chamber is spaced apart from an inner surface of the mixer housing by a gap, and wherein the inlet of the doser chamber is aligned with the doser mount opening in the mixer housing.

11. The mixer according to claim 1, wherein the first and second planar surfaces are perpendicular to the center axis.

12. A mixer for a vehicle exhaust gas system, the mixer comprising:

a mixer housing defining an internal cavity having a center axis;

a venturi section positioned within the internal cavity and including a plurality of mixing vanes, wherein the venturi section comprises a first stamping having a first base surface that faces an upstream direction and a second stamping having a second base surface that faces a downstream direction, and wherein the first stamping comprises a first wall extending downstream and away from the first base surface about a periphery of the first base surface, and wherein the second stamping comprises a second wall extending upstream and away from the second base surface about a periphery of the second base surface, and wherein the first stamping and the second stamping are attached to each other to provide a mixing chamber therebetween, and including a first doser chamber portion protruding radially outward of the first stamping and a second doser chamber portion protruding radially outward of the second stamping to cooperate with the first doser chamber portion to provide a doser chamber having an inlet and an outlet that is open to the mixing chamber; and a doser mount opening formed within the mixer housing that is aligned with the inlet.

13. The mixer according to claim 12, wherein the first stamping has a first attachment interface and the second stamping has a second attachment interface that is directly attached to the first attachment interface of the first stamping.

14. The mixer according to claim 12, wherein the plurality of mixing vanes comprise a plurality of upstream vanes and a plurality of downstream vanes, and wherein the first and second base surfaces comprise flat surfaces that respectively face the upstream and downstream directions, and wherein the first base surface includes the plurality of upstream vanes, with each upstream vane being bent away from the first base surface to provide openings that allow exhaust gas to flow into the mixing chamber, and wherein the second base surface includes the plurality of downstream vanes, with each downstream vane being bent away from the second base surface to provide openings that allow exhaust gas to exit the mixing chamber.

15. A mixer for a vehicle exhaust gas system, the mixer comprising:

a mixer housing defining an internal cavity having a center axis;

a venturi section positioned within the internal cavity and including a plurality of vanes, wherein the venturi section comprises a first stamping having a first base surface that faces an upstream direction and a second stamping having a second base surface that faces a downstream direction, wherein the first stamping and the second stamping are attached to each other to provide a mixing chamber therebetween, and including a first doser chamber portion protruding radially outward of the first stamping and a second doser chamber portion protruding radially outward of the second stamping to cooperate with the first doser chamber portion to provide a doser chamber having an inlet and an outlet that is open to the mixing chamber;

a doser mount opening formed within the mixer housing that is aligned with the inlet; and an upstream support flange and a downstream support flange that are used to mount the venturi section within the mixer housing, wherein the upstream support flange has an inner edge connected to the venturi section and an outer edge connected to the mixer housing, the outer edge being upstream of the inner edge about an outer periphery of the upstream support flange, and wherein the downstream support flange has an inner edge connected to the venturi section and an outer edge connected to the mixer housing, the outer edge being downstream of the inner edge about an outer periphery of the downstream support flange.

16. The mixer according to claim 15, wherein the upstream support flange is associated with the first stamping and includes a first plurality of openings and the downstream support flange is associated with the second stamping and includes a second plurality of openings.

17. The mixer according to claim 15, wherein the upstream and downstream support flanges extend at angles that are non-perpendicular to the center axis.

18. The mixer according to claim 12, wherein the inlet of the doser chamber is spaced apart from an inner surface of the mixer housing by a gap, and wherein the inlet of the doser chamber is aligned with the doser mount opening in the mixer housing.

19. The mixer according to claim 12, wherein the first base surface comprises a first planar surface and the second base surface comprises a second planar surface that is parallel to the first planar surface, and wherein the first and second planar surfaces are perpendicular to the center axis.

20. A mixer for a vehicle exhaust gas system, the mixer comprising:

a mixer housing defining an internal cavity having a center axis;

a venturi section including integrally formed mixing vanes and positioned within the internal cavity, wherein the venturi section comprises a first portion having a first base surface that faces an upstream direction and a second portion having a second base surface that faces a downstream direction, wherein the first portion and the second portion are combined to provide a mixing chamber therebetween, and including a first doser chamber portion protruding radially outward of the first portion and a second doser chamber portion protruding radially outward of the second portion to cooperate with the first doser chamber portion to form a doser chamber;

a doser mount opening formed within the mixer housing that is open to the doser chamber; and an upstream support flange and a downstream support flange that are used to mount the venturi section within the mixer housing, wherein the upstream support flange has an inner edge connected to the venturi section and an outer edge connected to the mixer housing, the outer edge being upstream of the inner edge about an outer periphery of the upstream support flange, and wherein the downstream support flange has an inner edge connected to the venturi section and an outer edge connected to the mixer housing, the outer edge being downstream of the inner edge about an outer periphery of the downstream support flange.

21. The mixer according to claim 20, wherein the upstream support flange is associated with the first portion and includes a first plurality of openings and the downstream support flange is associated with the second portion and includes a second plurality of openings.

22. The mixer according to claim 20, wherein the upstream and downstream support flanges extend at angles that are non-perpendicular to the center axis.

* * * * *